United States Patent
Rehl et al.

(10) Patent No.: US 9,255,545 B2
(45) Date of Patent: Feb. 9, 2016

(54) PISTON SKIRT COATING CONSISTING OF A LOW-FRICTION RUNNING-IN LAYER AND A LOW-WEAR BASE LAYER

(75) Inventors: Andreas Rehl, Heilbronn (DE);
Matthias Janke, Heilbronn (DE)

(73) Assignee: KS KOLBENSCHMIDT, GMBH, Neckarsulm (DE)

( * ) Notice: Subject to any disclaimer, the term of this patent is extended or adjusted under 35 U.S.C. 154(b) by 25 days.

(21) Appl. No.: 13/877,239

(22) PCT Filed: Sep. 23, 2011

(86) PCT No.: PCT/EP2011/066558
§ 371 (c)(1),
(2), (4) Date: Jul. 2, 2013

(87) PCT Pub. No.: WO2012/041769
PCT Pub. Date: Apr. 5, 2012

(65) Prior Publication Data
US 2013/0269648 A1    Oct. 17, 2013

(30) Foreign Application Priority Data
Oct. 1, 2010    (DE) .......................... 10 2010 047 279

(51) Int. Cl.
*C10M 125/26* (2006.01)
*F02F 3/00* (2006.01)
*C10M 111/04* (2006.01)
*F02F 3/10* (2006.01)
*F16J 1/04* (2006.01)

(52) U.S. Cl.
CPC ............ *F02F 3/0015* (2013.01); *C10M 111/04* (2013.01); *F02F 3/105* (2013.01); *F16J 1/04* (2013.01); *C10M 2201/0413* (2013.01); *C10M 2201/0613* (2013.01); *C10M 2201/0623* (2013.01); *C10M 2201/0653* (2013.01); *C10M 2201/0663* (2013.01); *C10M 2209/1003* (2013.01); *C10M 2213/0623* (2013.01); *C10M 2217/0443* (2013.01); *C10N 2210/02* (2013.01); *C10N 2210/03* (2013.01); *C10N 2210/04* (2013.01); *C10N 2210/08* (2013.01); *C10N 2220/082* (2013.01); *C10N 2220/086* (2013.01); *C10N 2240/10* (2013.01); *C10N 2250/14* (2013.01)

(58) Field of Classification Search
CPC ............ F02F 3/00; F02F 3/015; F02F 3/105; C10M 111/04; C10M 2213/0623; C10M 2217/0443; C10M 2050/08; C10N 2040/25
USPC ....................... 123/193.6; 29/888.048; 92/223
See application file for complete search history.

(56) References Cited

U.S. PATENT DOCUMENTS

| | | | |
|---|---|---|---|
| 5,486,299 A * | 1/1996 | Fuwa et al. | 508/106 |
| 5,884,600 A | 3/1999 | Wang et al. | |
| 6,684,844 B1 | 2/2004 | Wang et al. | |
| 8,430,020 B2 * | 4/2013 | Fujiwara et al. | 92/223 |
| 2009/0156437 A1 | 6/2009 | Kuroda et al. | |

FOREIGN PATENT DOCUMENTS

| | | |
|---|---|---|
| EP | 1433838 A1 | 6/2004 |
| EP | 1933022 A2 | 6/2008 |

* cited by examiner

*Primary Examiner* — Marguerite McMahon
(74) *Attorney, Agent, or Firm* — Young, Basile, Hanlon & MacFarlane P.C.

(57) ABSTRACT

A piston for internal combustion engines has a skirt coating consisting of a wear resistant inner layer consisting of a polymer matrix having ceramic particles, aramide fibers and/or carbon fibers dispersed therein and an outer layer consisting of a polymer matrix having solid lubricants dispersed therein and an outer layer consisting of a polymer matrix having solid lubricants dispersed therein.

8 Claims, 1 Drawing Sheet

PISTON SKIRT COATING CONSISTING OF A LOW-FRICTION RUNNING-IN LAYER AND A LOW-WEAR BASE LAYER

BACKGROUND

The present disclosure relates to a piston skirt coating and to a method for applying such a coating.

To ensure running-in and fail-safe operating properties, piston skirt coatings are known having a structure of functionally graduated structure, in the composition of which a compromise must be found between friction-reducing and wear-resistant properties.

Thus, especially wear-resistant pistons have carbon fiber-reinforced coatings with a high roughness value, which brings about disadvantages with respect to process monitoring (increased difficulty in determining film thickness) and the running-in phase of the engine (longer running-in period, increased friction). The hard fibers have an abrasive effect on cylinder walls which can result in undesirable polishing effects, or to the formation of grooves.

It is known from US 2009/0156437 A1 to furnish pistons for internal combustion engines with a double layer of an inner polymer layer having a solid lubricant and an outer polymer layer with hard particles of SIN or $Al_2O_3$. The outer hard coating is intended to reduce running-in time for the piston and to improve seize characteristics.

EP 1 433 838 A1 similarly describes a coating for moving metal parts that consists of an inner polymer layer with dispersed hard particles of $Al_2O_3$ and silicon nitride and an outer layer also with dispersed hard particles and solid lubricant. The hard particles in the outer layer are of a smaller diameter as those in the inner layer, which is intended to reduce the abrasiveness of the coating.

EP 1 933 022 A2 discloses a low-friction piston skirt coating made from a polymer layer containing a mixture of hard carbon or aramid fibers and solid lubricants.

All the coatings described here have a severe abrasive effect on account of the hard and partially rough outer layer, which requires large tolerances during manufacture and limits the use of the pistons with respect to the material of the cylinder wall. Wear-resistant outer layers lead, in particular with aluminum cylinder walls, to undesirable polishing effects or the formation of grooves, which, with increased friction, results in longer running-in time during the running-phase of the engine.

In contrast, U.S. Pat. No. 5,884,600 proposes an inner, hard coating of aluminum oxide for aluminum pistons, produced by anodizing the piston surface and an outer polymer layer containing solid lubricants such as graphite and boron nitride. The application of the first, hard aluminum oxide layer by anodizing the piston surface is a costly process, difficult to control regarding film thickness of the layer and results in a large number of unusable pistons in series production.

With respect to aluminum cylinder walls, iron-coated aluminum pistons have usually been used heretofore, that ensure increased protection against seizing and additionally do not affect cylinder honing. Iron coating represents a cost-intensive process in comparison to polymer-based coatings. In addition, especially wear-resistant layers usually contribute to greater friction because the adaptability of the layers to their opposite number is low.

It would be desirable to provide coatings for pistons for internal combustion engines that can be applied simply, that are wear-resistant and have low frictional losses as the result of improved running-in characteristics.

SUMMARY

The present coating is a double coat of an inner, hard layer and an outer, soft and/or smooth running-in layer.

The present coating is, therefore, for pistons for internal combustion engines characterized by a skirt coating of a wear-resistant inner layer of a polymer matrix with ceramic particles, aramid fibers and/or carbon fibers dispersed therein and an outer layer of a polymer matrix with solid lubricants dispersed therein.

Pistons have a functional inner layer applied directly to the surface of the piston or the still unfinished piston blank in combination with a wear-resistant substrate layer. Running-in characteristics are improved, protection against seizing is increased, and, by reducing friction, fuel consumption and $CO_2$ emissions are reduced when the combustion engine is operating.

The skirt coating optimized in regards to increased wear protection can be realized in smaller manufacturing tolerances as a result of the reduced roughness of the double layer. The expanded application range of polymer-based skirt coatings results in a substantial cost savings in the coating process as a replacement for cost-intensive iron coating. In addition, waste is considerably reduced in series production.

BRIEF DESCRIPTION OF THE DRAWING

The Figures shows a schematic representation of the double layer where FIG. 2 follows the coating.

DETAILED DESCRIPTION

Figure 1:
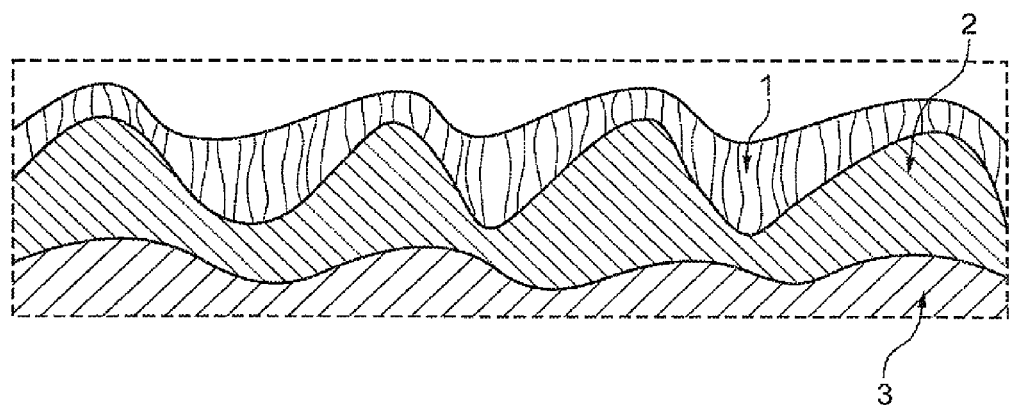

One or more compounds can be used as ceramic particles for an inner layer 2 of a piston skirt coating, selected from the TiO2 (titanium oxide) group, silicon carbide, silicon nitride, $Al_2O_3$ (aluminum oxide) silicon oxide, iron oxide, having a particle size of 0.1-20 μm.

Furthermore, the inner layer 2 can contain aramid, carbon, and/or polyphenylene sulfide fibers, with a length of 20-200 μm as a structural reinforcing element, or as structural reinforcing elements. The ceramic particles and/or fiber components can be used singly or as a mixture, wherein the proportion of the respective reinforcing materials in the inner layer 2, should, for example lie between 5 and 25% by weight (μm=microns).

One or more compounds can be used as the solid lubricant for an outer layer 1, selected from the MoS (molybdenum disulfide) and, by example, PTFE (polytetrafluoroethylene), graphite, zinc sulfide, boron nitride, the sulfides, and tellurides of molybdenum, tin, and titanium. Modeled after U.S. Pat. No. 6,684,844 B1 and taking into account its function as a soft, adaptable coating, the proportion of solid lubricant in the outer layer 1 should amount to, by example, between 15 and 40% by weight.

The polymer matrix of the inner layer 2 can consist of polymethylacrylate (PMMA), by example, polyamidamide (PAI), polyimide (PI), and/or epoxides, that of the outer layer of polymethylacrylate (PMMA), polyamide (PA) polyamidimide (PAI), polysiloxanes and/or epoxides, each singly or in a mixture.

The inner layer 2 can have a film thickness of 10 to 20 microns, the outer layer 1, independently of the inner layer 2, of 2 to 20 microns.

A method for manufacturing a skirt coating for pistons for internal combustion engines, consists of a wear-resistant inner layer 2 of a polymer matrix with ceramic particles, aramid and/or carbon fiber fibers dispersed therein and an outer layer 1 consists of a polymer matrix with solid lubricant materials dispersed therein, said method comprising sequential application of the inner layer 2 and the outer layer 1 on the piston 3 by means of a screen process, followed in each case by drying, or curing, of the layer at increased temperature.

The application of the inner base layer 2, optimized for wear resistance, containing, by example, carbon fibers and other materials as reinforcing elements in a preferred film thickness of 10 to 20 μm, for example, and of a thin running-in layer, optimized with respect to roughness and friction minimization, with a film thickness of 2 to 20 μm, for example, is carried out specifically through a screen process technique. The layers 1 and 2 are applied wet-on-wet to the piston 3 or including brief interim drying of the inner base layer 2, followed by the outer layer with a final, longer curing phase of the double layer. The temperature for curing can be between 150° C. and 230° C. and for a time period of 2 to 60 minutes. To shorten the curing process additional irradiation by infrared light can be included at the same time.

The particular printing pastes, consisting of a polymer resin, in solution in an organic, for example, polar aprotic solvent (e.g. gammabutyrolactone or N-ethylpyrrolidone) and filler and reinforcing materials blended therein, are produced by dissolvers and basket mills to prevent particle agglomerations or inhomogeneities. The temperature range during paste production should be between 15° C. and 60° C., for example, to prevent polymerization of the polymer material.

BRIEF DESCRIPTION OF THE DRAWING

Figure 2:
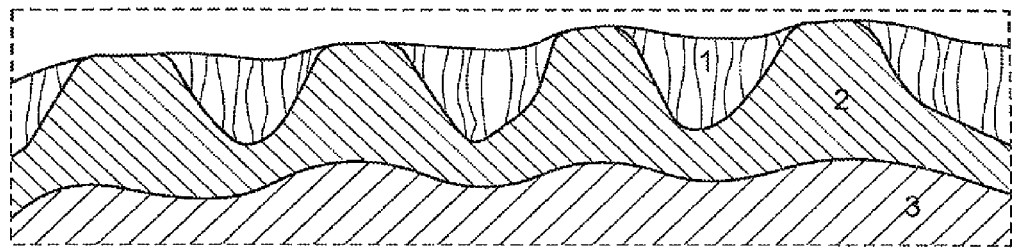
FIG. 2 follows the running-in phase.

FIG. 1 following coating; and
FIG. 2 following the running-in phase.

What is claimed is:

1. A piston for internal combustion engines, characterized by a skirt coating consisting of a wear-resistant inner layer consisting of a polymer matrix with at least one of ceramic particles, aramid fibers and carbon fibers dispersed therein and an outer layer consisting of a polymer matrix with solid lubricants dispersed therein.

2. The piston for internal combustion engines from claim 1, wherein:
    one or more compounds are used as ceramic particles for the inner layer, selected from the titanium oxide, silicon carbide, silicon nitride, aluminum oxide, silicon oxide, iron oxide group, having a particle size of 0.1 to 20 μm.

3. The piston for internal combustion engines from claim 1, wherein:
    one or more compounds used as the solid lubricant for the outer layer, are selected from the MoS (molybdenum disulfide), PTFE (polytetrafluoroethylene), graphite, zinc sulfide, boron nitride, the sulfides and tellurides of molybdenum, tin and titanium group.

4. The piston for internal combustion engines from claim 1, wherein:
    the polymer matrix of the inner layer consists of at least one of polyamidimide (PAI), polyimide (PI) and epoxides.

5. The piston for internal combustion engines from claim 1, wherein:
    the polymer matrix of the outer layer consists of polymethylacrylate (PMMA), polyamide (PA), polyamidimide (PAI), polyoxilanes and/or epoxides, singly or in a mixture with each other.

6. The for internal combustion engines from claim 1, wherein:
    the inner layer has a film thickness of 10 to 20 μm.

7. The piston for internal combustion engines from claim 1, wherein:
    the film thickness of the outer layer is from 2 to 20 μm.

8. A method for producing a skirt coating for pistons for internal combustion engines, consisting of:
    forming a wear-resistant inner layer consisting of a polymer matrix with at least one of ceramic particles, aramid fibers and carbon fibers dispersed therein;
    forming an outer layer consisting of a polymer matrix with solid lubricants dispersed therein;
    subsequently applying the inner layer and the outer layer by means of a screen process; and
    followed in each case by drying the inner layer and the outer layer at an elevated temperature.

\* \* \* \* \*